Sept. 15, 1953
J. E. HAWKINS
2,652,562
RADIO LOCATION SYSTEM
Filed Nov. 20, 1951
2 Sheets-Sheet 1
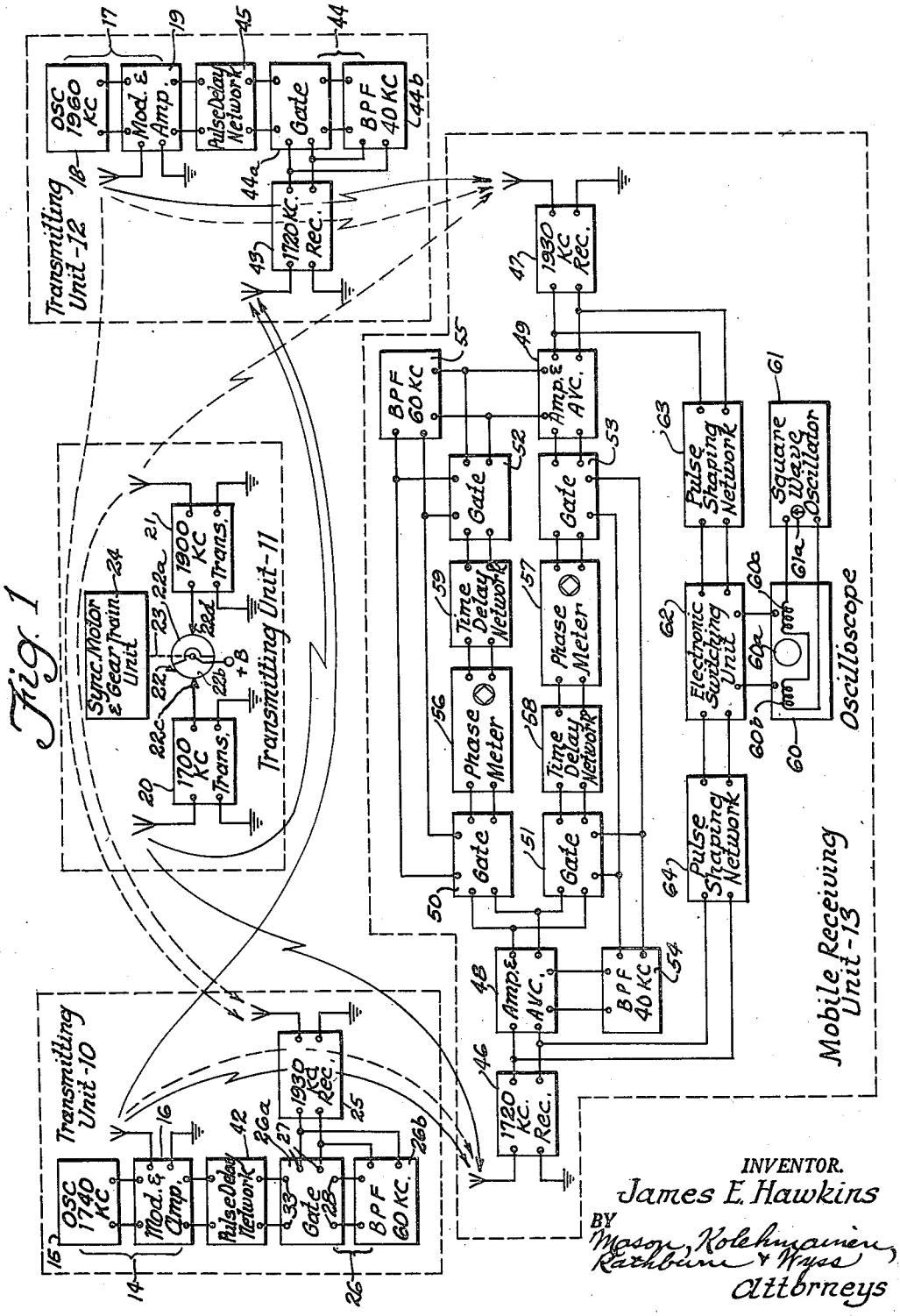
INVENTOR.
James E. Hawkins
BY Mason, Kolehmainen,
Rathburn & Wyss
Attorneys

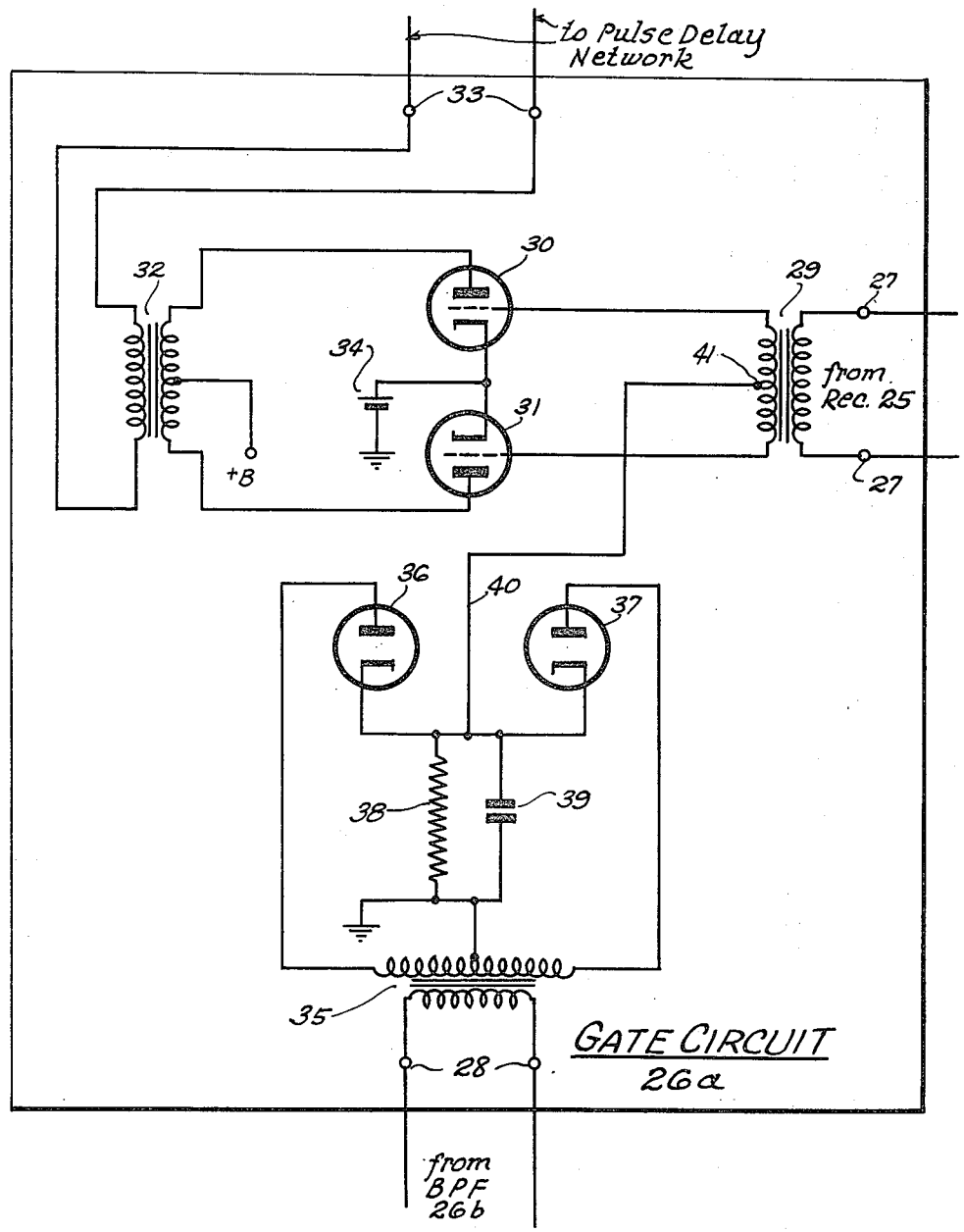

Patented Sept. 15, 1953

2,652,562

UNITED STATES PATENT OFFICE 2,652,562

RADIO LOCATION SYSTEM

James E. Hawkins, Tulsa, Okla., assignor to Seismograph Service Corporation, Tulsa, Okla., a corporation of Delaware Application November 20, 1951, Serial No. 257,322

18 Claims. (Cl. 343—105)

The present invention relates to systems of position finding or distance determination and more particularly to an improved radio position finding system which is capable of providing nonambiguous information identifying with precision accuracy the position of a mobile vehicle relative to a known point. The present invention is an improvement on the system disclosed and broadly claimed in United States Patent No. 2,513,321 which is assigned to the same assignee as the present applicaton.

As explained in the above identified patent, aside from various types of radio direction finding systems, radio position finding systems generally fall into two classes, namely continuous wave systems in which phase comparison of two or more space radiated waves is relied upon to produce the desired position information at a wave receiving point, and pulsed signal systems in which pulse transit time is the factor from which position information is derived.

In systems of the continuous wave type, the continuous waves radiated from a pair of spaced transmitters produce standing waves in space, the phase relationship of which changes as a function of changing position between the two transmitting points. More specifically, the standing waves produced by each pair of transmitting units of the system are characterized by isophase lines which are hyperbolic in contour about the transmitting points as foci. On a base line connecting the pair of transmitters, these isophase lines are spaced apart a distance equal to one-half the mean wave length of the radiated waves and have diverging spacings at points on either side of this line. With this system arrangement, the position of a receiving point relative to a pair of hyperbolic isophase lines may be determined by measuring the phase relationship between continuous waves radiated from the pair of transmitters. Since the location of the receiving point along the zone separating the two isophase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate in so far as the position indications produced at the receiving point are concerned. To obtain the desired indication accuracy, however, it is necessary to maintain phase synchronization between the continuous waves radiated by the spaced transmitters, or alternatively, so to arrange the system that phase shifts between the radiated waves are compensated during the phase comparing operation. Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of service required in position determining systems. To obviate this problem, systems of the continuous wave hyperbolic type have been proposed (see Honore United States Patent No. 2,148,267) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely self-compensating so that the measured phase angle is truly representative of the location of the receiving point between a pair of equiphase lines. While the described arrangement for obviating the phase synchronization problem completely solves this problem, it entails the use of two carrier channels for the link transmitters in addition to the three or four channels taken up by the three or four continuously operating survey transmitters, in order to make up a complete system. Improved arrangements for eliminating the link transmitters without eliminating the functions thereof are disclosed and claimed in Hawkins and Finn Patent No. 2,513,317. Another troublesome problem encountered in the operation of continuous wave systems, as pointed out in the above referred to Patent No. 2,513,321 is that of eliminating ambiguity from the phase measurements which provide the desired position information. Thus while the two phase measurements identify the position of the receivng station relative to two intersecting pairs of hyperbolic isophase lines, they do not indicate which pairs of lines the indications are related to. This means that in operating the system, the geographic location of the receiving station must be known at the start of movement of this station relative to the transmitting stations, and further that the lines must be counted as the receiving station is moved relative to the grid-like pattern of hyperbolic lines. It also means that a mobile craft entering the radiation pattern of the transmitters cannot utilize the radiated signals to determine its position without using auxiliary equipment to determine the approximate position of the craft relative to the position signal transmitters.

While pulsed signal radio position finding systems of the type employing fixed position transmitting for radiating the pulsed position indicating signals, such, for example, as loran, obviate the ambiguity problem inherent in phase comparison systems, they are generally much less accurate than phase comparison systems and hence are not well adapted for several types of survey work or navigation requiring highly accurate position data. Moreover, pulsed systems of the type referred to require synchronized pulse transmission from widely spaced pulse transmitters; a problem which is as difficult to solve as that of phase synchronization in commercial types of phase comparison systems. In general, pulsed systems of the character described, like the phase comparison systems, are of the hyperbolic type in that lines representative of constant pulse transit time difference intervals are hyperbolic and have the transmitting points as foci. Both types of hyperbolic systems require the use of specially prepared hyperbolic charts for the purpose of converting indications derived from the received position indicating signals into actual position data, making use of the constant velocity of propagation of radio waves.

The combined pulse transit time and phase comparison system of Patent No. 2,513,321 completely solves the ambiguity problem, but in the system there disclosed, sharply tuned narrow band pass filters are employed in the various signal channels to separate the various pulsed position indication and reference signals which may cause serious phase shift difficulties due to differing frequency response characteristics of the filters unless the band pass filters are carefully selected and balanced, and even then variations in the existing temperatures at the various transmitters and at the receiving point will cause unsymmetrical variations in the filter characteristics.

It is an object of the present invention, therefore, to provide an improved radio position determining or ranging system which obviates substantially all of the problems outlined above.

It is another object of the invention to provide a combined pulse transit time and phase comparison system of position determination which is non-ambiguous, requires no synchronization whatever of the position indicating signals radiated by the transmitters, requires a minimum number of frequency channels and utilizes common transmitting and receiving equipment for the transmission and reception of the two types of position indicating signals, eliminates the necessity of sharply tuned band pass filters in the signal circuits, and in which the signals radiated by the transmitting equipment may be commonly received and utilized at any number of receiving stations.

It is still another object of the invention to provide improved and exceedingly simple receiving equipment for use in a combined pulse transit time and phase comparison position determining system of the character described.

It is a still further object of the invention to provide an improved and exceedingly simple transmission system for use in a combined pulse transit time and phase comparison system of the character described.

The invention, both as to its organization and method of operation, together with further objects and advantages thereof, will best be understood by reference to the specification taken in connection with the accompanying drawings, in which:

Fig. 1 is a diagrammatic representation of the component arrangement of the equipment provided at the transmitter units and one mobile receiving station or unit of a three-foci position indicating system embodying the invention; and Fig. 2 is a diagrammatic representation of a suitable gate circuit which may be employed in the equipment shown in Fig. 1.

Referring now to the drawings, the present invention is there illustrated in its embodiment in a combined pulse transit time and phase comparison system of position determination for providing position information aboard the boats of survey crews, for example, operating over a water covered area. In brief, the system comprises three transmitting units 10, 11 and 12 which are spaced apart approximately equal distances and are so positioned that a line joining the units 10 and 11 is angularly related to a line joining the units 11 and 12. As described more fully below, the end transmitting units 10 and 12 include transmitters for continuously radiating carrier wave signals of two different frequencies and the central transmitting unit 11 comprises two transmitters which are controlled alternately to radiate periodic signal pulses of two still different frequencies, such that a system of standing waves or a standing signal pattern is effectively produced in space to blanket the area under survey. More specifically, the wave interference pattern produced by the signals radiated by the transmitter of the unit 10 and one of the transmitters of the unit 11 during each interval when the latter transmitter is operating, is characterized by hyperbolic isophase lines having the radiation points of the transmitting units 10 and 11 as foci. Similarly, the interference pattern produced in space by the signals radiated from the transmitter of the unit 12 and the other transmitter of the central transmitting unit 11 during each period when the latter transmitter is operating, is characterized by hyperbolic isophase lines having the radiation points of the transmitting units 11 and 12 as foci. Due to the angular relationship between the lines joining the transmitting units 10—11 and 11—12, the two sets of hyperbolic isophase lines intersect to produce a grid-like pattern of intersecting hyperbolic lines. A second grid-like pattern of hyperbolic lines representative of the loci of predetermined constant pulse transit time difference intervals will be produced as a result of the pulsed control of the two transmitters in the transmitting unit 11. This second grid-like pattern of hyperbolic lines likewise consists of two intersecting sets of lines, one of which has the radiation points of transmitting units 10 and 11 as foci and the other of which has the radiation points of the transmitting units 11 and 12 as foci. Preferably the pulse transit time through certain sections of the equipment provided at the two end transmitting units 10 and 12 is so controlled that the hyperbolic lines representative of predetermined constant pulse transit time difference intervals are spacially coincident with at least certain of the hyperbolic isophase lines such that a single hyperbolic coordinate chart may be employed in converting phase comparison indications and pulse transit time difference intervals, as measured at any receiving station within the propagation range of the transmitting system, into position data.

As shown in Fig. 1 of the drawings, the system further comprises translating and receiving equipment generally designated as a mobile receiving station or unit 13 which may be disposed aboard one or more recording boats operating in the area under survey. In this connection, it may be pointed out that in certain types of survey work over water such, for example, as seismic survey operations, it is conventional practice to equip each survey crew with a recording boat on which all recording operations are performed. It may further be pointed out that any number of mobile receiving stations or units 13 of the character shown may utilize the signals originating at the transmitting units 10, 11 and 12 to obtain the desired position data.

Referring now more particularly to the drawings, the transmitter 14 at the unit 10 comprises a carrier wave generator or oscillator 15 and a modulator and power amplifier unit 16. Similarly, the transmitter 17 embodied in the transmitting unit 12 comprises a carrier wave oscillator or generator 18 and a modulator and power amplifier unit 19.

The transmitting unit 11 comprises two transmitters 20 and 21 for respectively radiating pulsed position indicating carrier waves at two different carrier frequencies, together with switching means for alternately rendering these two transmitters operative. In the arrangement illustrated, periodic keying of the two transmitters 20 and 21 for alternate operation is accomplished by alternately feeding anode current to the electron discharge tubes of the respective transmitters from the positive terminal of the anode current source, not shown, through a commutating ring 22 which is shaft connected by means of a shaft 23 to be driven at a constant speed by a synchronous motor and gear train unit 24. More specifically, the positive terminal of the anode current source is connected to the conductive segment 22b of the commutating ring 22, which segment spans slightly less than half the circumference of the ring. The remainder of the ring is comprised of an insulating segment 22a. At diametrically opposed points around the circumference of the ring, brushes 22c and 22d are provided which engage the ring periphery. These brushes are respectively connected to the positive bus conductors of the two transmitters 20 and 21, such that anode current is alternately delivered to the electron discharge tubes of the two transmitters. Since the conductive segment 22b of the ring 22 represents slightly less than half the peripheral surface of the ring, it will be understood that a short off-signal period is provided between successive pulse periods during which the transmitters 20 and 21 are alternately operated, thus preventing simultaneous radiation of waves by both transmitters. The periodicity with which the two transmitters 20 and 21 are alternately operated is, of course, dependent upon the speed of rotation of the commutating ring 22. Preferably, this ring is driven at a speed of thirty revolutions per second such that the transmitters 20 and 21 are alternately rendered operative to generate pulsed signals at the rate of thirty pulses (of each signal) per second.

As indicated in Fig. 1, the carrier frequencies at which the four transmitters of the three transmitting units 10, 11 and 12 operate are all different. Specifically, the output frequency of the transmitter 20 and the output frequency of the transmitter 14 in the unit 10, forming the first transmitter pair, may be 1700 and 1740 kilocycles, respectively, such that the difference frequency therebetween is 40 kilocycles, while the output frequencies of the transmitter 21 and the transmitter 17 of the unit 12, forming the second transmitter pair, may be 1900 and 1960 kilocycles, respectively, such that the difference frequency therebetween is 60 kilocycles. It will be noted that the channels in which the two pairs of carrier frequencies fall are separated in the frequency spectrum by approximately 160 kilocycles, thus facilitating selective reception of these carrier pairs in the manner more fully explained below. The power of the four transmitters is such that the entire area in which position information may be desired aboard the vehicle or vessel carrying the receiving unit 13 is blanketed with waves radiated from each of the four transmitters and that these waves have a field strength at all points within this area sufficient to permit reliable reception without requiring undue sensitivity of the receiving equipment.

In order to obviate the above-mentioned difficulties attendant with phase synchronization of the position indication carrier waves and synchronization of the signal pulses radiated by the transmitters, while at the same time eliminating the necessity for utilizing additional frequency channels, means are provided in the transmitting units 10 and 12 for alternately modulating the waves radiated by the transmitters of the units 10 and 12 with pulsed reference signals representative of the difference frequencies between the carrier wave pairs. These pulsed reference signals may be received at any receiving point such, for example, as at the mobile receiving unit 13, located within the radius of transmission of the four transmitters. The equipment for this purpose as provided at the transmitting unit 10 comprises a fixed tuned amplitude modulation receiver 25, center tuned to a frequency of 1930 kilocycles and having a response band broad enough to admit the 1900 and 1960 kilocycle signals respectively radiated by the transmitters 21 and 17. The selectivity of this receiver is obviously such that the carrier waves radiated by the transmitter 20 and the transmitter 14 are rejected in the radio frequency sections thereof. The beat frequency pulses of 60 kilocycles between the two carriers accepted by the radio frequency section of the receiver 25 are reproduced in the low frequency section of this receiver and delivered to a suitable normally-closed frequency-responsive gate means 26 comprising a gate circuit 26a and a sharply tuned 60 kilocycle band pass filter 26b. As shown, the 60 kilocycle signal from the receiver 25 is supplied not only to the input terminals 27 of the normally closed or non-conducting gate circuit 26a, but is also supplied through the band pass filter 26b to the control terminals 28 of the gate circuit.

Various types of gate circuits may be employed in systems embodying the present invention so long as the gate circuits selected provide a distortionless wide pass band, and in Fig. 2 there is shown a suitable gate circuit which is identified, for example, as the gate circuit 26a at the transmitting unit 10. As shown in Fig. 2, the gate circuit includes a suitable input and isolating transformer 29, the primary winding of which is connected to the input terminals 27 and the secondary winding of which is connected to the grids of a pair of three element electron discharge devices 30 and 31 which are connected in push-pull relation and adapted to be biased for class A operation. The anode cathode circuits of the tubes 30 and 31 are connected, as shown, to the primary winding of an output transformer 32, the secondary winding of which is connected to the output terminals 33 of the gate circuit. Normally, the tubes 30 and 31 are biased beyond cutoff as, for example, by a battery 34 connected to the cathodes of the tubes, so that no signal will pass from the input terminals to the output terminals of the gate circuit through the tubes 30 and 31. As previously mentioned, however, the control terminals 28 of the gate circuit are connected for energization from the 60 kilocycle band pass filter 26b and, as shown in Fig. 2, these terminals are connected to the primary winding of a control transformer 35, the secondary winding of which is connected to a full wave rectifier comprising a pair of two element tubes 36 and 37, the rectifier circuit including a suitable cathode load resistor 38 and a bypass condenser 39. As shown, one end of the load resistor 38 is connected by a suitable conductor 40 to a mid tap 41 on the secondary winding of the input transformer 29 which supplies the grids of the tubes 30 and 31. Thus, whenever a 60 kilocycle signal is supplied through the band pass filter 26b to the control terminals 28 of the gate circuit 26a, a rectified positive voltage will be supplied to the grids of the tubes 30 and 31 so as to reduce the negative bias on the tubes to the proper value for class A operation. Consequently, so long as the 60 kilocycle signal is present at the control terminals, any signal supplied to the input terminals 27 will be conducted through the gate circuit 26a to the output terminals 33. Thus, the 60 kilocycle signal is delivered to the modulator 16 for amplitude modulation upon the carrier output of the transmitter 14 through the gate circuit 26a and pulse transit time delay means in the form of a pulse delay network 42.

Similarly, the transmitting unit 12 is equipped with a fixed tuned amplitude modulation receiver 43 which is center tuned to a carrier frequency of 1720 kilocycles and has a response band broad enough to accept the 1700 and 1740 kilocycle signals respectively radiated by the transmitter 20 and the transmitter 14. Here again, the selectivity of the receiver 43 is obviously such that the carrier waves radiated by the transmitter 21 and the transmitter 17 of the unit 12 are rejected in the radio frequency sections of the receiver. The beat frequency pulses of 40 kilocycles between the two carrier waves accepted by the receiver 43 are reproduced in the low frequency section thereof and supplied to the input terminals of the gate circuit 44a and a 40 kilocycle band pass filter 44b forming a normally closed gate means 44. As described in connection with unit 10, the 40 kilocycle signal supplied through the band pass filter 44b renders the gate circuit conductive whereby the 40 kilocycle signal is supplied to the modulator 19 through the gate circuit and a pulse transit time delay means in the form of a pulse delay network 45 and is modulated upon the carrier wave output of the transmitter 17 embodied in the transmitting unit 12.

Referring now more particularly to the equipment making up the receiving unit 13 at the mobile receiving station, this equipment comprises a pair of fixed tuned amplitude modulation receivers 46 and 47, the output circuits of which are respectively connected through suitable amplifier and automatic gain or volume control stages 48 and 49 to two pairs of normally closed gate circuits 50—51 and 52—53 and to a pair of band pass filters 54 and 55, the 40 kilocycle band pass filter being arranged to control the gate circuits 51 and 53 and the 60 kilocycle band pass filter being arranged to control the gate circuits 50 and 52, and the output terminals of the gate circuits being connected, as shown, to a pair of phase angle meters 56 and 57. A time delay network 58 is interposed in the signal transmission path between the gate 51 and the phase meter 57, and a time delay network 59 is included in the signal transmission path between the gate 52 and the phase meter 56. More specifically, the receiver 47 is fixed tuned to a carrier frequency of 1930 kilocycles and is designed to accept the pulsed signal radiated by the transmitter 21 and the carrier wave radiated by the transmitter 17 of the unit 12 both when the latter is modulated and unmodulated. Similarly, the receiver 46 is fixed tuned to a carrier frequency of 1720 kilocycles and is designed to accept the pulsed signal radiated by the transmitter 20 and the carrier wave continuously radiated by the transmitter 14 of the unit 10 both when the latter is modulated and unmodulated. The automatic gain control or AVC circuits associated with the amplifier stages 48 and 49 may be of any well known type capable of functioning without introducing amplitude distortion or variable phase shift in the reference signals and the heterodyne or difference frequency signals developed at the output terminals of the receivers 46 and 47. The time delay networks 58 and 59 are respectively provided in the receiving apparatus to compensate for the phase shift introduced into the beat frequency signal pulse translating channels of the transmitting units 10 and 12 by the pulse delay networks 42 and 45. These delay networks are preferably of the adjustable delay type disclosed at pages 354 and 355 in "Radar Engineering," by Fink, published by the McGraw-Hill Book Company in 1947. The gate means comprising the filters 54 and 55, which may be of any standard commercial construction, and the gate circuits 50, 51, 52 and 53 perform the function of selecting the heterodyne or difference frequency signal pulses alternately developed at the output terminals of the receivers 46 and 47, and delivering these signals to the phase meters 56 and 57. These meters may be of the general character disclosed in Patent No. 1,762,725 to Marrison, granted June 10, 1930, and are capable of measuring phase angles in excess of 360 electrical degrees between two impressed signal voltages. Each phase meter is equipped with a rotatable rotor carrying a pointer which indexes with a circular scale to indicate the phase relationship between the two impressed voltages.

For the purpose of obtaining pulse transit time difference indications from the received signals in the manner more fully explained below, pulse transit time comparison means comprising an oscilloscope 60, a square wave oscillator 61, an electronic switching unit 62 and a pair of pulse shaping networks 63 and 64 are provided in the mobile receiving unit to respond to the pulsed signals originating at the transmitters of the units 10, 11 and 12. More specifically, the signal pulses developed at the output terminals of the receiver 47 are shaped to accentuate the pulse build-up of each pulse and sharpen the pulses in the pulse shaping network 63 and delivered to the terminals of the oscilloscope 60 through the electronic switching unit 61. Similarly, the signal pulses developed across the output terminals of the receiver 46 are shaped to accentuate the pulse build-up of each pulse and sharpen the pulses in the pulse shaping network 64 and delivered to the terminals of the oscilloscope through the electronic switching unit 62. Preferably, the pulse shaping networks 63 and 64 are of the character disclosed in Fig. 13.18a, page 501 in "Radar System Engineering," by Ridenour, published by the McGraw-Hill Book Company in 1947. The electronic switching unit 62 performs the function of alternately delivering signal pulse energy developed at the output terminals of the networks 63 and 64 to the oscilloscope 60 and preferably is of the commercial type YE-9, manufactured by the General Electric Company of Schenectady, New York. The oscilloscope 60 is preferably of the commercial type 256-D, manufactured by Allen B. Dumont Laboratories, Inc., of Passaic, New Jersey. The square wave oscillator 61 is adjustable as to frequency by means comprising a frequency control element 61a and may be of any standard type. In cooperation with the horizontal magnetic deflection coils 60b and 60c, which are externally located with respect to the tube 60a of the oscilloscope, this oscillator functions to confine the horizontal trace path of the cathode ray beam alternately to selected zones of the tube screen in the manner described in Patent No. 2,513,321.

In considering the operation of the above-described position determining system, it will be understood that when the motor and gear train unit 24 is operating to drive the commutating ring 22, anode current is alternately delivered to the electron discharge tubes of the transmitters 20 and 21, such that these transmitters are alternately rendered operative to radiate carrier waves at frequencies of 1700 and 1900 kilocycles, respectively. The transmitters of the units 10 and 12, on the other hand, operate continuously. Accordingly, during each interval when the transmitter 20 is in operation, the carrier waves of 1700 and 1740 kilocycles respectively radiated by the transmitter 20 and the transmitter 14 are picked up and heterodyned in the radio frequency sections of the receivers 43 and 46. In the receiver 43, the difference frequency signal pulse of 40 kilocycles is reproduced in the low frequency section of the receiver, passed by the gate circuit 44a, delayed in time by the pulse delay network 45 and modulated upon the carrier wave output of the transmitter 17 for radiation as a reference signal pulse. If desired an amplifier and automatic gain control unit similar to the units 48 and 49 may be interposed in the output circuit of the receiver 43 in order to maintain constant modulation. The signal pulse modulated carrier wave radiated by the unit 12 is received by the receiver 47 of the mobile receiving unit 13 and the 40 kilocycle signal pulse is reproduced at the output terminals of this receiver. During the period indicated, the transmitter 21 is not in operation and hence no heterodyne or beat frequency signal pulse is developed by the receiver 47. The 40 kilocycle reference signal pulse thus reproduced by the receiver 47 is amplified to the proper level in the amplifier and AVC stage 49 and applied to the input terminals of the two gate circuits 52 and 53 and also to the input terminals of the 60 kilocycle band pass filter 55. This filter rejects the applied signal pulse and the pulse is thus ineffective to open the gate circuit 52 which prevents the pulse from being applied to the right set of input terminals of the phase meter 56 through the delay network 59.

The 40 kilocycle beat frequency or heterodyne signal pulse resulting from heterodyning of the pulsed carrier radiated by the transmitter 20 with the continuous carrier radiated by the transmitter 14 of the unit 10 in the radio frequency section of the receiver 46 is reproduced across the output terminals of this receiver and after being amplified to the proper level in the amplifier and AVC stage 48 is applied to the two gate circuits 50 and 51 and also to the band pass filter 54. Since the band pass filter 55 is maintaining the gate 50 closed, the 40 kilocycle signal from the receiver 46 is prevented from reaching the phase meter 56. The 40 kilocycyle signal from the receiver 46, however, is passed by the band pass filter 54 and is effective to render the gate circuits 51 and 53 conductive. The signal pulse developed across the output terminals of the receiver 46 is thus transmitted through the gate 51 and the delay network 58 to the left set of terminals of the phase meter 57, and since the gate 53 has also been rendered conductive, the 40 kilocycle signal developed at the receiver 47 passes to the right hand set of input terminals of the phase meter 57. Thus two signal voltages of identical frequency and equal amplitude are applied to the two sets of input terminals of the phase meter 57 with the result that this phase meter functions accurately to measure the phase angle therebetween. This phase angle indication is accurately representative of the position of the receiving unit 13 between two isophase lines of the standing wave pattern produced in space as a result of the carrier waves radiated by the transmitter 20 and the transmitter 14 of the unit 10.

It will be observed that neither the band pass filter 44b at the unit 12 or the band pass filter 54 at the receiving unit 13 is disposed in the signal transit paths of the 40 kilocycle signals applied to the phase meter 57, the filters being interposed only in the control channels for the gate circuits 44a, 51 and 53. Accordingly, no phase shift problems are presented by the filters. However, the 40 kilocycle signal applied to the right hand terminals of the phase meter 57 in traversing the modulation path of the transmitter 17 in the unit 12, passes through the delay network 45. No counterpart for the phase delay produced by the network 45 is included in the direct signal transit paths from the transmitter 20 and the transmitter of the unit 10 to the mobile receiving station 13. Thus, in the absence of the network 58, the phase unbalancing network 45 would be included only in the signal input paths to one side of the phase meter 57 and as a consequence, minor changes in the signal frequency, say for example, from 40 kilocycles to 40.1 or 39.9 kilocycles, would result in non-compensated phase shifts in one of the two signal input paths of the phase meter circuit thereby causing the phase meter 57 to give an erroneous indication. Such erroneous indications are prevented, however, by providing means in the system for automatically compensating for undesirable phase shifts which could otherwise be produced in the delay network 45, which means comprises the previously mentioned time delay network 58, which is identical with the network 45 and is incorporated in the left hand branch of the input circuit of the phase meter 57 between this meter and the gate 51.

At the end of the described transmitting interval, the commutating ring 22 functions to interrupt the circuit for delivering anode current to the tubes of the transmitter 20, with the result that carrier wave radiation from this transmitter is terminated. When radiation of this wave stops, the carrier heterodyning action of the two receivers 43 and 46 is likewise terminated to interrupt the reference signal pulse radiated by the transmitter 17 of the unit 12 and to interrupt the heterodyne or difference frequency signal pulse being developed across the output terminals of the receiver 46. Thus the phase meter 57 is rendered ineffective further to change the setting of its indicating element.

A short time interval after operation of the transmitter 20 is stopped, the commutating ring 22 functions to deliver anode current to the tubes of the transmitter 21 and thus initiate operation of this transmtiter. With the transmitter 21 in operation, a 1900 kilocycle position indicating signal pulse is radiated thereby which is accepted by the receivers 25 and 47. More specifically, the receiver 25 functions to heterodyne the pulsed carrier wave radiated by the transmitter 21 with the 1960 kilocycle carrier wave continuously radiated by the transmitter 17 of the unit 12 and to reproduce the heterodyne or difference frequency signal of 60 kilocycles in the low frequency section thereof. This difference frequency or reference signal pulse is passed by the filter 26b and is effective to open the gate circuit 26a whereby the 60 kilocycle signal passes through the gate circuit, is delayed in time by the network 42, modulated upon the output carrier wave of the generator 15 in the modulator and power amplifier unit 16 and radiated as a modulation component upon the carrier wave transmitted by the transmitter 14 of the unit 10 to the receiver 46.

The signal pulse modulated carrier wave radiated by the unit 10 is received by the receiver 46 of the mobile receiving unit 13 and the 60 kilocycle signal pulse is reproduced at the output terminals of this receiver. During the period indicated, the transmitter 20 is not in operation and hence no heterodyne or beat frequency signal pulse is developed by the receiver 46. The 60 kilocycle reference signal pulse, thus reproduced by the receiver 46 is amplified to the proper level in the amplifier and AVC stage 48 and applied to the input terminals of the two gate circuits 50 and 51 and also to the input terminals of the 40 kilocycle band pass filter 54. This filter rejects the applied signal pulse and the pulse is thus ineffective to open the gate circuit 51 which prevents the pulse from being applied to the left hand set of input terminals of the phase meter 57 through the delay network 58.

The 60 kilocycle beat frequency or heterodyne signal pulse resulting from heterodyning of the pulsed carrier radiated by the transmitter 21 with the continuous carrier radiated by the transmitter 17 of the unit 12 in the radio frequency section of the receiver 47 is reproduced across the output terminals of this receiver and after being amplified to the proper level in the amplifier and AVC stage 49 is applied to the two gate circuits 52 and 53 and also to the band pass filter 55. Since the band pass filter 54 is maintaining the gate 53 closed, the 60 kilocycle signal from the receiver 47 is prevented from reaching the phase meter 57. The 60 kilocycle signal from the receiver 47, however, is passed by the band pass filter 55 and is effective to render the gate circuits 50 and 52 conductive. The signal pulse developed across the output terminals of the receiver 47 is thus transmitted through the gate 52 and the delay network 59 to the right set of terminals of the phase meter 56, and since the gate 50 is also rendered conductive, the 60 kilocycle signal developed at the receiver 46 passes to the left hand set of input terminals of the phase meter 56. Thus two signal voltages of identical frequency and equal amplitude are applied to the two sets of input terminals of the phase meter 56 with the result that this phase meter functions accurately to measure the phase angle therebetween. This phase angle indication is accurately representative of the position of the receiving unit 13 between two isophase lines of the standing wave pattern produced in space as a result of the carrier waves radiated by the transmitter 21 and the transmitter 17 of the unit 12.

As previously described in connection with the circuits for the phase meter 57, but for the provision of the component 59, the input circuits to the phase meter 56 would be unbalanced in that the left hand branch would effectively include the pulse delay network 42 interposed in the modulation path between the receiver 25 and the modulator 16. Such unbalance would cause an undesirable phase shift in response to minor variations in the signal frequency for reasons explained above. The described unbalance is eliminated, however, by including the delay network 59, identical with the delay network 42 between the gate 52 and the right set of input terminals of the phase meter 56. The delay networks 42 and 59 are adjusted to have identical phase shift characteristics and erroneous indications of the phase meter 56 due to changes in the frequency of the 60 kilocycle reference and heterodyne signal pulses are thus eliminated.

The reason for providing the gate means 26 and 44 in the modulation paths of the transmitting units 10 and 12 is that of preventing interfering signals from being radiated by the transmitters of these two units. Thus with the transmitter 20 and the transmitter 14 of the transmitting unit 10 operating, the output signal of the transmitting unit 12 consists of a 1960 kilocycle carrier wave modulated at 40 kilocycles. This signal is accepted by the receiver 25 at the unit 10 and the 40 kilocycle modulation component is reproduced across the output terminals of the receiver. If the gate circuit 26a and the 60 kilocycle band pass filter 26b were not provided in the modulation path of the transmitting unit 10, the described 40 kilocycle signal would be modulated upon the carrier radiated by the transmitting unit 10 and reproduced by the receiver 46 at the receiving station 13 to interfere with the 40 kilocycle heterodyne signal being concurrently produced in the receiver 46 through direct heterodyning of the carrier waves received from the transmitter 20 and the transmitter 14 of the transmitting unit 10. However, by providing the gate means 26, the 40 kilocycle signal reproduced by the receiver 25 is blocked from the modulator 16 and hence is not radiated by the transmitter 14. In a similar manner, the gate means 44 including the gate circuit 44a and the 40 kilocycle band pass filter 44b prevent spurious modulation of the carrier radiated by the transmitter of the transmitting unit 12 with a 60 kilocycle signal during those pulse periods when the transmitter 21 is operating.

At the end of the described signal pulse interval, the commutating ring 22 functions to interrupt anode current flow to the tubes of the transmitter 21 and thus arrest operation of this transmitter. When carrier wave radiation by the transmitter 21 is thus terminated, the wave heterodyning action effected in the receivers 25 and 47 is instantly stopped to terminate the radiation of the 60 kilocycle reference signal pulse by the transmitter 14 of the unit 10 and to terminate reproduction of the difference or heterodyne signal pulse at the output terminals of the receiver 47. Thus the application of signal voltages to the two sets of input terminals of the phase meter 56 is interrupted, with the result that no further change in the setting of the indicating element of this meter can be produced. A short time interval after operation of the transmitter 21 is arrested, the commutating ring 22 functions to recomplete the circuit for delivering anode current to the tubes of the transmitter 20 and thus reinitiate operation of this transmitter with the results described above.

From the foregoing explanation, it will be understood that the transmitters 20 and 21, in their alternate operation to radiate pulsed carrier waves, cooperate with the receivers 43 and 25 of the transmitting units 12 and 10 alternately to render the transmitters of these latter units operative to radiate position indicating signal pulses and reference signal pulses. More in particular, the pulsed position indicating carrier waves alternately radiated by the transmitters 20 and 21 alternately cause the position indicating carrier waves respectively radiated by the transmitters of the units 12 and 10 to be modulated with reference signal pulses during periods when these latter transmitters are respectively inactive as position indicating signal radiators. At the receiving station, the receivers 46 and 47 alternately detect and develop reference signal pulses and position indicating signal pulses which are amplified to equal amplitude levels in the stages 48 and 49 and supplied to the phase meters 56 and 57.

In order to illustrate the action which occurs, arrow pointed solid lines have been shown in Fig. 1 of the drawings to indicate the receiving points of signal acceptance and the sources of the accepted signals during each pulse period when the transmitter 20 is operating, and arrow pointed dashed lines have been shown to illustrate the receiving points of signal acceptance and the sources of accepted signals during each pulse period when the transmitter 21 is operating.

As will also be evident from the above explanation, the phase meter 57 functions to produce a phase angle indication which is representative of the position of the receiving unit 13 between two isophase lines of the standing waves produced in space as a result of carrier wave radiation by the transmitter 20 and the transmitter of the unit 10. With the described arrangement, wherein carrier wave frequencies of 1700 and 1740 kilocycles are employed, the wavelength spacing between the isophase lines along the base line connecting the units 10 and 11 is determined by the mean frequency of 1720 kilocycles between the two radiated carrier waves. At this particular mean frequency, isophase lines representative of the same phase relationship between the standing waves produced by the transmitter 20 and the transmitter of the unit 10 along the base line joining the units 10 and 11 are spaced apart a distance of about 286 feet. Hence the indication provided by the phase meter 57 identifies the position of the receiving unit 13 within a zone not less than 286 feet in width, i. e., a zone having a minimum width equal to one half the wavelength of a wave having a frequency equal to the mean frequency of the position indicating carrier waves radiated by the transmitter 20 and the transmitter of the unit 10.

As previously indicated, the indication provided by the phase meter 57, standing alone, is ambiguous for the reason that this indication does not identify the point of location of the receiving unit 13 along the zone separating the two adjacent isophase lines of the standing waves produced in space by the transmitter 20 and the transmitter of the unit 10. Identification of this point is obtained through the response of the receiving unit to the position indicating signal pulses radiated by the transmitter 21 and the transmitter 17 of the unit 12. Thus, the phase meter 56 provides an indication of the position of the receiving station, namely the unit 13, between two isophase lines of the standing waves effectively produced in space by the radiation of position indicating carrier waves from the transmitter 21 and the transmitter 17 of the unit 12. Here again, the wavelength spacing of the isophase lines along the base line connecting the two units 11 and 12 is determined by the mean frequency of 1930 kilocycles between the frequencies of the waves radiated by the transmitter 21 and the transmitter 17. At this particular mean frequency, isophase lines representative of the same phase relationship between the standing waves produced by the two identified transmitters have a minimum spacing of approximately 255 feet, such that the indication provided by the meter 56 identifies the position of the receiving unit 13 within a zone having a minimum width of 255 feet. The two indications thus provided by the phase meters 56 and 57 may readily be converted to position data by consulting a hyperbolic chart showing the hyperbolic isophase lines in their geographic relationship to the known radiation points of the transmitting units 10, 11 and 12.

As previously indicated herein, although the position indications provided by the two phase meters identify the position of the receiving unit 13 relative to the isophase lines with extreme accuracy, they are ambiguous in the sense that they do not identify the particular lanes between these lines in which the signals are collected at the receiving unit 13. Hence, unless the starting point of the unit 13 is known and the lanes are counted as the station is moved about within the area of signal radiation from the three transmitting units 10, 11 and 12, the indications provided by the two phase meters cannot be interpreted to identify the position of the receiving unit 13.

The ambiguity of the indications provided by the phase meters 56 and 57 is resolved by utilizing the pulse transit time comparison means comprising the oscilloscope 60, the square wave oscillator 61, the switching unit 62 and the two pulse shaping networks 64 and 63 to measure the time differences between the signal pulses developed across the output terminals of the two receivers 46 and 47. In this regard it will be recalled that the transmitters in the units 10 and 12 are in continuous operation and alternately serve as heterodyning signal sources for the pulsed signals originating at the transmitting unit. Thus the signal pulses all originate at a common point, namely the radiation point of the transmitting unit 11. Each pulse is transmitted to the receiving unit 13 over two different routes. Thus each signal pulse radiated by the transmitter 20 is directly transmitted to the receiver 46 and is in transit between the transmitter 20 and the receiver 46 a variable time interval $T_a$ determined solely by the distance between the radiation point of the transmitting unit 11 and the signal collecting point of the receiving unit 13. These pulses are identified as the pulses $P_1$ and each thereof traverses the signal translating channel through the components 46, 64, 62 and 60 in the time interval $T_z$. Each pulse radiated by the transmitter 20 is also transmitted to the receiver 43 in a pulse transit interval $T_b$, traverses the receiver translating channel and the modulation path of the transmitting unit 12 in the transit interval $T_x$ is transmitted to the receiver 47 of the receiving unit 13 in the transit interval $T_c$ and traverses the signal translating path through the components 47, 63, 62 and 60 in the time interval $T_y$. The pulses traversing this path are identified as the pulses $P_2$. Preferably the components 46, 47, 60, 62, 63 and 64 are so designed that the pulse transit intervals $T_y$ and $T_z$ are equal. Each of the intervals $T_y$ and $T_z$ is constant. The pulse transit interval $T_b$ is constant and is determined by the length of the base line connecting the transmitting units 11 and 12. For any given adjustment of the delay network 45, the pulse transit interval $T_x$ is also a constant. The pulse transit interval $T_c$ is a variable determined by the distance between the signal radiating point of the transmitting unit 12 and the signal collection point of the receiving unit 13. Thus, for any given signal pulse radiated by the transmitter 20, the pulse transit difference time TD, as measured by the oscilloscope 60, between the pulse as reproduced by the receiver 46 and later by the receiver 47 is as follows:

$$TD = T_b + T_x + T_c + T_y - T_a - T_z \quad (1)$$

However, $$T_b + T_x + T_y - T_z = K = \text{a constant time interval} \quad (2)$$

Therefore, $$TD = K + T_c - T_a \quad (3)$$

It can easily be shown that Equation 3 above is the equation of a hyperbola. Hence it will be understood that the locus of all points representative of a given constant pulse transit time difference interval is a hyperbola having the radiation points of the transmitter 20 and the transmitter of the unit 12 as foci, and that spaced apart hyperbolic lines all having the radiation points of these transmitters as foci are representative of different constant pulse transit time difference intervals.

In a similar manner, each signal pulse radiated by the transmitter 21 is directly transmitted to the receiver 47 and is in transit between the transmitter 21 and the receiver 47 a variable time interval $T_{a1}$ determined solely by the distance between the radiation point of the transmitting unit 11 and the signal collecting point of the receiving unit 13. These pulses are identified as the pulses $P_3$ and each traverses the signal translation channel through the components 47, 63, 62 and 60 in the time interval $T_y$. Each pulse radiated by the transmitter 21 is also transmitted to the receiver 25 in a pulse transit interval $T_{b1}$, traverses the receiver translating channel and the modulation path of the transmitting unit 10 in the transit interval $T_{x1}$ is transmitted to the receiver 46 of the receiving unit 13 in the transit interval $T_{c1}$ and traverses the signal translating path through the components 46, 64, 62 and 60 in the time interval $T_z$. The pulses traversing this path are identified as the pulses $P_4$. The pulse transit interval $T_{b1}$ is constant and is determined by the length of the base line connecting the transmitting units 10 and 11. For any given adjustment of the pulse delay network 42, the pulse transit interval $T_{x1}$ is also a constant. The pulse transit interval $T_{c1}$ is a variable determined by the distance between the signal radiation point of the transmitting unit 10 and the signal collection point of the receiving unit 13. Thus in considering any given signal pulse radiated by the transmitter 21, the pulse transit difference time $TD_1$, as measured by the oscilloscope 60, between the pulse as reproduced by the receiver 47 and later by the receiver 46 may be represented by the equation:

$$TD_1 = T_{b1} + T_{x1} + T_{c1} + T_z - T_{a1} - T_y \quad (4)$$

However, $$\quad (5)$$

$$T_{b1} + T_{x1} + T_z - T_y = K_1 = \text{a constant time interval}$$

Therefore, $$TD_1 = K_1 + T_{c1} - T_{a1} \quad (6)$$

It can easily be shown that Equation 6 above is the equation of a hyperbola. It will be understood, therefore, that the locus of all points representative of a given constant pulse transit time difference interval, as between the transit times required for the pulse originating at the transmitter 21 to reach the receiving unit 13 over the two paths, is a hyperbola having the radiation points of the transmitter 21 and the transmitter of the unit 10 as foci, and further that spaced apart hyperbolic lines all having the radiation points of these two transmitters as foci are representative of different constant pulse transit time difference intervals. Referring now more particularly to the manner in which the electronic switching unit 62 and the square wave oscillator 61 control visual reproduction of the signal pulses by the cathode ray tube 60a of the oscilloscope 60, it is pointed out above that the switching unit 62 alternately derives signal pulse energy from the two pulse shaping networks 63 and 64 and delivers this energy to the vertical deflection electrodes of the tube 60a through the signal channel of the oscilloscope. Further, by suitable adjustment of the balance control means provided in the switching unit 62, vertical separation of the visually reproduced signal pulses is effected. Hence when two signal pulses are received from the two pulse shaping networks 64 and 63 during a horizontal trace period of the oscilloscope, they are reproduced one above the other on the screen of the cathode ray tube 60a. The frequency of switching of the electronic switching unit 62 is extremely high in comparison with the sweep repetition rate of the oscilloscope 60, being preferably of the order of $10^6$ switching cycles per second. The sweep repetition rate of the oscilloscope 60 is adjusted to a value exactly twice the rate of switching of the transmitters 20 and 21, i. e., 60 sweep cycles per second.

During operation of the equipment, the square wave oscillator 61 and the horizontal amplifier in the oscilloscope 60 cooperate to restrict the length of the beam trace paths horizontally of the cathode ray screen alternately to zones such that the pulses $P_1$ and $P_2$ received at the receiving unit 13 over the two different paths from the transmitting unit 11 when the transmitter 20 is operating are reproduced in a beam trace zone to the left of the cathode ray tube screen, whereas the pulses $P_3$ and $P_4$ received at the receiving unit 13 over the two different paths from the transmitting unit 11 when the transmitter 21 is operating are reproduced in a beam trace zone to the right of the screen. By suitable adjustment of the frequency adjusting element 61a of the oscillator 61, the output frequency of this oscillator is adjusted precisely to equal the frequency at which the transmitters 20 and 21 are switched at the transmitting unit 11, i. e., to a value of 30 cycles per second.

From the above explanation, it will be understood that during each period when the transmitter 20 is operating to cause development of the pulses $P_1$ and $P_2$ across the output terminals of the pulse shaping networks 64 and 63, respectively, horizontal deflection of the cathode ray beam in the tube 60a is confined to the left hand zone on the screen. As the two pulses $P_1$ and $P_2$ are developed at the output sides of the networks 64 and 63, the electronic switching unit, which is operating at an extremely high switching frequency, causes successive small increments of each pulse to be reproduced visually on the screen of the tube 60a. Moreover, due to the unbalanced setting of the balance control means embodied in the switching unit 62, the reproduced increments of the signal pulses are displaced vertically on the screen. Thus, during each horizontal sweep of the cathode ray beam, at least the initial portions of the two pulses $P_1$ and $P_2$ are reproduced on the screen.

After the time of one-half cycle of the square wave oscillator 61 has elapsed, this oscillator operating in conjunction with the deflection coils 60b and 60c deflects the beam of the tube 60a to confine horizontal deflection thereof to the right hand zone. During the interval when the cathode ray beam is confined to this zone, the transmitter 21 operates in the manner explained above to cause development of the pulses $P_3$ and $P_4$ across the output terminals of the pulse shaping networks 63 and 64, respectively. Here again, the rapid switching of the oscilloscope input terminals between the output sides of the two networks 63 and 64 causes reproduction of the pulses $P_3$ and $P_4$ in small increments. However, over the elapsed time of the horizontal beam sweep in progress, at least the initial portions of both pulses are reproduced on the screen within the right hand zone thereof. Since each of the pulses $P_1$, $P_2$, $P_3$ and $P_4$ is developed at the transmitting unit 11 at the rate of 30 pulses per second, it will be understood that the initial portion of each pulse is reproduced on the screen of the cathode ray tube 60a at the same rate. Due to the persistence of vision of the human eye, and the image persistence of the fluorescent screen of the tube 60a, the initial portions of the four signal pulses continuously persist on the screen in the four different positions described.

Thus, the time delay TD between the initial portions of the pulses $P_1$ transmitted directly from the transmitter 20 of the transmitting unit 11 to the receiving unit 13 over the path $T_a$ and the initial portions of the pulses $P_2$ transmitted from the transmitter 20 to the receiving unit 13 by way of the transmitting unit 12 is accurately indicated on the cathode ray tube screen by the horizontal displacement between the starting points of the pulses $P_1$ and $P_2$. Similarly, the time delay $TD_1$ between the initial portions of the pulses $P_3$ transmitted directly to the receiving unit 13 from the transmitter 21 over the path $T_{a1}$ and the initial portions of the pulses $P_4$ transmitted to the receiver unit 13 from the transmitter 21 by way of the transmitting unit 10 is accurately indicated on the screen by the horizontal displacement between the starting points of the pulses $P_3$ and $P_4$. By proper interpretation of the measured delay intervals TD and $TD_1$, through the use of hyperbolic coordinate charts having intersecting hyperbolic lines representative of constant pulse transit time difference intervals and having the known radiation points of the transmitting unit 10, 11 and 12 as foci, the exact geographic location of the receiving unit 13 may easily be determined.

Referring to Equations 2 and 4 above, it can be shown that the disposition of any particular hyperbolic line representative of a predetermined constant pulse transit time difference interval relative to the radiation points of the two spaced transmitters is determined by the constant K as regards Equation 2 and the constant $K_1$, as regards Equation 4. Considering Equation 2 by way of example, the constant K is partially determined by the transit time $T_b$ which in turn depends upon the distance between the transmitting units 11 and 12 and hence cannot conveniently be varied. However, this constant is also determined by the transit time $T_x$, which may be varied as desired by suitable adjustment of the pulse delay network 45. Preferably, this factor $T_x$ is so adjusted that the constant pulse transit time difference interval line bisecting the base line between the radiation points of the transmitting units 11 and 12 is a straight line spacially coincident with the isophase line bisecting this base line. Similarly, the pulse delay network 42 is preferably so adjusted that the transit interval $T_{x1}$ produces a constant pulse transit time difference interval line in space which bisects the base line between the radiation points of the transmitting units 10 and 11 and is spacially coincident with the isophase line bisecting this base line. When the straight pulse transit time difference interval lines are thus brought into spacial coincidence with the straight isophase lines, the families of phase and pulse transit time difference interval hyperbolas are properly orientated with respect to each other. Hence each isophase line is also representative of the locus of all points of a constant pulse transit interval. Accordingly, the same families of hyperbolic lines may be used for the dual purpose of interpreting phase and pulse transit time indications. Thus, a single coordinate chart may be used at the receiving unit 13 to interpret the indications provided by the phase meters 56 and 57 and also by the oscilloscope 60.

While one embodiment of the invention has been described, it will be understood that various modifications may be made therein which are within the true spirit and scope of the invention as defined in the appended claims.

What is claimed as new and desired to be secured by Letters Patent is:

1. A combined pulse transit time and phase comparison system of position determination, comprising a receiving station, transmitting apparatus including transmitters for concurrently radiating signals of different frequencies and means for pulsing one of said signals, a reference signal repeating station remote from said receiving station, means at each of said stations for heterodyning said signals to produce signal pulses having a frequency related to the beat frequency between the heterodyned signals, means including normally closed gate means responsive to said signal pulses for transmitting the signal pulses produced at said repeating station to said receiving station, pulse transit time comparison means at said receiving station response to the time difference between the signal pulses developed locally at said receiving station and the signal pulses trainsmitted to said receiving station from said repeating station for producing one indication representative of the position of said receiving station relative to said repeating station, phase measuring means at said receiving station responsive to the phase relationship between the waves within the signal pulses developed locally at said receiving station and the waves within the signal pulses transmitted to said receiving station from said repeating station for producing a second indication representative of the position of said receiving station relative to said repeating station, and normally closed gate means at said receiving station responsive to at least one of said signal pulses for supplying said locally generated and said transmitted signal pulses to said phase measuring means for phase comparison.

2. A combined pulse transit time and phase comparison system of position determination, comprising a receiving station, transmitting apparatus including transmitters for concurrently radiating signals of different frequencies and means for pulsing one of said signals, a reference signal repeating station remote from said receiving station, means at each of said stations for heterodyning said signals to produce signal pulses having a frequency related to the beat frequency between the heterodyned signals, means including normally closed gate means responsive to said signal pulses for transmitting the signal pulses produced at said repeating station to said receiving station, pulse transit time comparison means at said receiving station response to the time difference between the signal pulses developed locally at said receiving station and the signal pulses transmitted to said receiving station from said repeating station for producing one indication representative of the position of said receiving station relative to said repeating station, phase measuring means at said receiving station responsive to the phase relationship between the waves within the signal pulses developed locally at said receiving station and the waves within the signal pulses transmitted to said receiving station from said repeating station for producing a second indication representative of the position of said receiving station relative to said repeating station, and normally closed gate means at said receiving station responsive to said locally generated signal pulses for supplying said locally generated and said transmitted signal pulses to said phase measuring means for phase comparison.

3. A combined pulse transit time and phase comparison system of position determination, comprising a receiving station, transmitting apparatus including transmitters for concurrently radiating signals of different frequencies and means for pulsing one of said signals, a reference signal repeating station remote from said receiving station, means at each of said stations for heterodyning said signals to produce signal pulses having a frequency related to the beat frequency between the heterodyned signals, means including normally closed gate means responsive to said signal pulses for transmitting the signal pulses produced at said repeating station to said receiving station, phase measuring means at said receiving station responsive to the phase relationship between the waves within the signal pulses developed locally at said receiving station and the waves within the signal pulses transmitted to said receiving station from said repeating station for producing a highly accurate but ambiguous indication representative of the position of said receiving station relative to said repeating station, normally closed gate means at said receiving station responsive to at least one of said signal pulses for supplying said locally generated and said transmitted signal pulses to said phase measuring means for phase comparison, and pulse transit time comparison means at said receiving station responsive to the time difference between the signal pulses developed locally at said receiving station and the signal pulses transmitted to said receiving station from said repeating station for producing a non-ambiguous but less accurate indication representative of the position of said receiving station relative to said repeating station.

4. A combined pulse transit time and phase comparison system of position determination, comprising two transmitters for radiating signals at different frequencies and at spaced radiation points, transmitting means for radiating pulsed signals alternately at two still different frequencies from at least one additional radiation point, means including normally closed frequency responsive gate means responsive to said pulsed signals for alternately modulating the signals radiated by said two transmitters with reference signal pulses, said radiated signals effectively producing standing waves in space characterized by two intersecting sets of spaced hyperbolic isophase lines having different pairs of said transmitting points as foci and also by two intersecting sets of spaced hyperbolic lines representative of different constant pulse transit difference intervals which also have said different pairs of transmitting points as foci, and a receiving station including means responsive to said signals and separately controlled in accordance with the phase relationship between said waves and the pulse transit difference intervals for producing a plurality of separate indications representative of the position of said receiving station relative to certain of said lines.

5. A combined pulse transit time and phase comparison system of position determination, comprising two transmitters for radiating signals at different frequencies and at spaced radiation points, transmitting means for radiating pulsed signals alternately at two still different frequencies from at least one additional radiation point, means including normally closed frequency responsive gate means responsive to said pulsed signals for alternately modulating the signals radiated by said two transmitters with reference signal pulses, said radiated signals effectively producing standing waves in space characterized by two intersecting sets of spaced hyperbolic isophase lines having different pairs of said transmitting points as foci and also by two intersecting sets of spaced hyperbolic lines representative of different constant pulse transit difference intervals which also have said different pairs of transmitting points as foci, means included in said system for establishing spacial coincidence between at least a portion of said hyperbolic isophase lines and a corresponding portion of the hyperbolic lines representative of different constant pulse transit difference intervals, and a receiving station including means responsive to said signals and separately controlled in accordance with the phase relationship between said waves and the pulse transit difference intervals for producing a plurality of separate indications representative of the position of said receiving station relative to certain of said lines.

6. A combined pulse transit time and phase comparision system of position determination, comprising two transmitters for radiating signals at different frequencies and at spaced radiation points, transmitting means for radiating pulsed signals alternately at two still different frequencies from at least one additional radiation point, means including normally closed frequency responsive gate means responsive to said pulsed signals for alternately modulating the signals radiated by said two transmitters with reference signal pulses, said radiated signals effectively producing standing waves in space characterized by two intersecting sets of spaced hyperbolic isophase lines having different pairs of said transmitting points as foci and also by two intersecting sets of spaced hyperbolic lines representative of different constant pulse transit difference intervals which also have said different pairs of transmitting points as foci, reference pulse transit time control means interposed in the paths of modulation of said two transmitters for establishing spacial coincidence between at least a portion of said hyperbolic isophase lines and a corresponding portion of the hyperbolic lines representative of different constant pulse transit difference intervals, and a receiving station including means responsive to said signals and separately controlled in accordance with the phase relationship between said waves and the pulse transit difference intervals for producing a plurality of separate indications representative of the position of said receiving station relative to certain of said lines.

7. A position determining system, comprising a receiving station, transmitting means for transmitting pulsed wave trains to said receiving station over two different paths, and receiving and translating apparatus at said receiving station including phase measuring means responsive to said waves for producing one indication representative of the position of said receiving station relative to said transmitting means, said receiving and translating means including normally closed gate means responsive to at least one of said pulsed wave trains for supplying said waves to said phase measuring means for phase comparison, and pulse excited means responsive to the pulsing of said wave trains for producing a second indication representative of the position of said receiving station relative to said transmitting means.

8. A position determining system, comprising a receiving station, transmitting means for transmitting wave trains to said receiving station over two different paths, means common to said paths for pulsing said wave trains in unison, and receiving and translating apparatus at said receiving station including means responsive to the time displacement between corresponding pulses of said wave trains for producing one indication representative of the position of said receiving station relative to said transmitting means, phase measuring means responsive to the waves within the pulses for producing a second indication of the position of said receiving station relative to said transmitting means, and normally closed gate means responsive to said pulses for supplying said waves within the pulses to said phase measuring means.

9. A transmission system for a combined pulse transit time and phase comparison system of position determination, comprising a first transmitter for continuously radiating a first signal of one frequency, a second transmitter for radiating a pulsed signal of different frequency, a third transmitter for radiating a carrier signal at a third frequency, heterodyning means for heterodyning said first and pulsed signals to produce a pulsed reference signal having a frequency related to the beat frequency between said first and pulsed signals, and means including normally closed gate means responsive to said pulsed reference signal for modulating said pulsed reference signal upon the carrier signal radiated by said third transmitter, said signals effectively producing standing waves in space characterized by spaced hyperbolic isophase lines having the radiation points of said first and second transmitters as foci and also by spaced hyperbolic lines representative of different constant pulse transit difference intervals which have the radiation points of said second and third transmitters as foci.

10. A transmission system for a combined pulse transit time and phase comparison system of position determination, comprising a first transmitter for continuously radiating a first signal of one frequency, a second transmitter for radiating a pulsed signal of different frequency, a third transmitter for radiating a carrier signal at a third frequency, heterodyning means for heterodyning said first and pulsed signals to produce a pulsed reference signal having a frequency related to the beat frequency between said first and pulsed signals, means including normally closed gate means responsive to said pulsed reference signal for modulating said pulsed reference signal upon the carrier signal radiated by said third transmitter, said signals effectively producing standing waves in space characterized by spaced hyperbolic isophase lines having the radiation points of said first and second transmitters as foci and also by spaced hyperbolic lines representative of different constant pulse transit difference intervals which have the radiation points of said second and third transmitters as foci, and means included in said system for determining the spacial disposition of at least certain of said hyperbolic lines.

11. A transmission system for a combined pulse transit time and phase comparison system of position determination, comprising a first transmitter for continuously radiating a first signal of one frequency, a second transmitter for radiating a pulsed signal of different frequency, a third transmitter for radiating a carrier signal at a third frequency, heterodyning means for heterodyning said first and pulsed signals to produce a pulsed reference signal having a frequency related to the beat frequency between said first and pulsed signals, modulating means for modulating said pulsed reference signal upon the carrier signal radiated by said third transmitter, said signals effectively producing standing waves in space characterized by spaced hyperbolic isophase lines having the radiation points of said first and second transmitters as foci and also by spaced hyperbolic lines representative of different constant pulse transit difference intervals which have the radiation points of said second and third transmitters as foci, normally closed gate means responsive to said pulsed reference signal for supplying said reference signal to said modulating means, and reference pulse transit time control means interposed between said gate means and said modulating means to determine the spacial disposition of at least certain of said last-mentioned hyperbolic lines.

12. A transmission system for a combined pulse transit time and phase comparison system of position determination, comprising two transmitters for radiating signals at different frequencies and at spaced radiation points, transmitting means for radiating pulsed signals alternately at two still different frequencies from at least one additional radiation point, and means including normally closed gate means responsive to said pulsed signals for alternately modulating the signals radiated by said two transmitters with reference signal pulses, said radiated signals effectively producing standing waves in space characterized by two intersecting sets of spaced hyperbolic isophase lines having different pairs of said transmitting points as foci and also by two intersecting sets of spaced hyperbolic lines representative of different constant pulse transit difference intervals which also have said different pairs of transmitting points as foci.

13. A transmission system for a combined pulse transit time and phase comparison system of position determination, comprising two transmitters for radiating signals at different frequencies and at spaced radiation points, transmitting means for radiating pulsed signals alternately at two still different frequencies from at least one additional radiation point, means including normally closed gate means responsive to said pulsed signals for alternately modulating the signals radiated by said two transmitters with reference signal pulses, said radiated signals effectively producing standing waves in space characterized by two intersecting sets of spaced hyperbolic isophase lines having different pairs of said transmitting points as foci and also by two intersecting sets of spaced hyperbolic lines representative of different constant pulse transit difference intervals which also have said different pairs of transmitting points as foci, and means included in said system for establishing spacial coincidence between at least a portion of said hyperbolic isophase lines and a corresponding portion of the hyperbolic lines representative of different constant pulse transit difference intervals.

14. A transmission system for a combined pulse transit time and phase comparison system of position determination, comprising two transmitters for radiating signals at different frequencies and at spaced radiation points, transmitting means for radiating pulsed signals alternately at two still different frequencies from at least one additional radiation point, means including normally closed gate means responsive to said pulsed signals for alternately modulating the signals radiated by said two transmitters with reference signal pulses, said radiated signals effectively producing standing waves in space characterized by two intersecting sets of spaced hyperbolic isophase lines having different pairs of said transmitting points as foci and also by two intersecting sets of spaced hyperbolic lines representative of different constant pulse transit difference intervals which also have said different pairs of transmitting points as foci, and reference pulse transit time control means interposed in the paths of modulation of said two transmitters and energizable through said gate means for establishing spacial coincidence between at least a portion of said hyperbolic isophase lines and a corresponding portion of the hyperbolic lines representative of different constant pulse transit difference intervals.

15. A transmission system for a combined pulse transit time and phase comparison system of position determination, comprising spaced first and second transmitters for radiating signals of different frequencies, transmitting means for radiating pulsed signals alternately at two still different frequencies from a third radiation point, and means associated with said first and second transmitters and including normally closed gate means responsive to said pulsed signals for alternately modulating the signals radiated by said first and second transmitters with reference signal pulses, the signals radiated by said first and second transmitters and the pulsed signal of one frequency effectively producing standing signal patterns in space characterized by a first set of spaced hyperbolic isophase lines having said third radiation point and said first transmitter as foci and also a first set of spaced hyperbolic lines representative of different constant pulse transit difference intervals which have said third radiation point and said second transmitter as foci, and the signals radiated by said first and second transmitters and the pulsed signal of the other frequency effectively producing standing signal patterns in space characterized by a second set of spaced hyperbolic isophase lines having said third radiation point and said second transmitter as foci and also a second set of spaced hyperbolic lines representative of different constant pulse transit difference intervals which have said third radiation point and said first transmitter as foci.

16. A transmission system for a combined pulse transit time and phase comparison system of position determination, comprising spaced first and second transmitters for radiating signals of different frequencies, transmitting means for radiating pulsed signals alternately at two still different frequencies from a third radiation point, means for heterodyning one of said pulsed signals with the signal radiated by said second transmitter to develop a pulsed reference signal having a frequency related to the beat frequency of the heterodyned signals, means including normally closed gate means responsive to said pulsed reference signal for modulating said pulsed reference signal upon the signal radiated by said first transmitter, means for heterodyning the other of said pulsed signals with the signal radiated by said first transmitter to develop a second pulsed reference signal having a frequency related to the beat frequency of the heterodyned signals, means including normally closed gate means responsive to said second pulsed reference signal for modulating said second pulsed reference signal on the signal radiated by said second transmitter, said one pulsed signal and the signals radiated by said transmitters effectively producing standing signal patterns in space characterized by a first set of hyperbolic isophase lines having said first transmitter and said third radiation point as foci and also by a first set of spaced hyperbolic lines representative of different constant pulse transit difference intervals, and said other pulsed signal and the signals radiated by said transmitters effectively producing standing signal patterns in space characterized by a second set of hyperbolic isophase lines having said second transmitter and said third radiation point as foci and also by a second set of spaced hyperbolic lines representative of different constant pulse transit difference intervals having said first transmitter and said third radiation point as foci, reference pulse transit delay means interposed in the path of modulation of said first transmitter and energizable through said first mentioned gate means for establishing spacial coincidence between at least a portion of the hyperbolic isophase lines of said first set and a corresponding portion of the hyperbolic lines of the second set of lines representative of different constant pulse transit difference intervals, and additional reference pulse transit delay means interposed in the path of modulation of said second transmitter and energizable through said second mentioned gate means for establishing spacial coincidence between at least a portion of the hyperbolic isophase lines of said second set and a corresponding portion of the hyperbolic lines of the first set of lines representative of different constant pulse transit difference intervals.

17. Wave signal receiving and translating apparatus for translating pulsed signals into position indications, comprising a pair of receivers for producing a pair of pulsed position indicating signals in response to the separate reception of a pair of signals which are pulsed in synchronism and are transmitted to said receivers over different routes, means responsive to the time displacement between corresponding pulses of said position indicating signals for producing one position indication, phase measuring means responsive to the phase relationship of the waves within corresponding pulses of said position indicating signals for producing a second position indication, and normally closed gate means responsive to said pulses for supplying said position indicating signals to said phase measuring means for phase comparison.

18. Wave signal receiving apparatus for translating into position indications two sets of three signals, at least two of the signals of each set being pulsed in synchronism and the pulsed signals of the two sets being alternately pulsed, a first receiver for receiving a pair of signals of one of said sets of signals and for heterodyning the receiver signals to produce a first pulsed position indicating signal having a frequency related to the difference frequency of the heterodyned signals, a second receiver for receiving the third signal of said one set of signals and for reproducing the pulses thereof to develop a second pulsed position indicating signal having the same frequency as said first pulsed position indicating signal, said second receiver being alternately operative to receive and heterodyne a pair of signals of the other of said sets of signals, thereby to produce a third pulsed position indicating signal having a frequency related to the difference frequency of the heterodyned signals, and said first receiver being concurrently operative to receive the third signal of said other set of signals and to reproduce the pulses thereof, thereby to develop a fourth pulsed position indicating signal having the same frequency as said third position indicating signal, pulse transit time comparison means alternately excited first by said first and second position indicating signals and then by said third and fourth position indicating signals and responsive to the time displacement between corresponding pulses of the exciting signals for alternately producing two different position indications, phase measuring means alternately excited first by said first and second position indicating signals and then by said third and fourth position indicating signals and responsive to the phase relationship of the waves within corresponding pulses of the exciting signals for alternately producing two additional position indications, normally closed gate means responsive to at least one of said first and second position indicating signals for supplying said first and second position indicating signals to said phase measuring means, and other normally closed gate means responsive to at least one of said third and fourth position indicating signals for supplying said third and fourth position indicating signals to said phase measuring means.

JAMES E. HAWKINS.

References Cited in the file of this patent
UNITED STATES PATENTS

| Number | Name | Date |
|---|---|---|
| 2,513,321 | Hawkins | July 4, 1950 |